US012792042B2

(12) United States Patent
Blom

(10) Patent No.: US 12,792,042 B2
(45) Date of Patent: Nov. 10, 2026

(54) ROBOTIC WORK TOOL WITH A RE-DEFINABLE OPERATION AREA

(71) Applicant: HUSQVARNA AB, Huskvarna (SE)

(72) Inventor: Robert Blom, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 453 days.

(21) Appl. No.: 18/265,875

(22) PCT Filed: Dec. 2, 2021

(86) PCT No.: PCT/SE2021/051194
§ 371 (c)(1),
(2) Date: Jun. 7, 2023

(87) PCT Pub. No.: WO2022/124960
PCT Pub. Date: Jun. 16, 2022

(65) Prior Publication Data

US 2024/0103529 A1 Mar. 28, 2024

(30) Foreign Application Priority Data

Dec. 8, 2020 (SE) .................................... 2051431-1

(51) Int. Cl.
*G05D 1/00* (2024.01)

(52) U.S. Cl.
CPC ......... *G05D 1/0274* (2013.01); *G05D 1/0278* (2013.01)

(58) Field of Classification Search
CPC ............... G05D 1/0274; G05D 1/0278; G05D 2111/10; G05D 2111/30; G05D 1/2232;
(Continued)

(56) References Cited

U.S. PATENT DOCUMENTS 10,444,760 B2 10/2019 Grufman et al.
10,568,258 B2 2/2020 Wahlgren
(Continued)

FOREIGN PATENT DOCUMENTS

CN 111176282 A 5/2020
EP 3018548 A1 5/2016
(Continued)

OTHER PUBLICATIONS

International Search Report and Written Opinion for International Application No. PCT/SE2021/051194 mailed Mar. 9, 2022.
(Continued)

*Primary Examiner* — Anne Marie Antonucci
*Assistant Examiner* — Jodi Jones
(74) *Attorney, Agent, or Firm* — Burr & Forman

(57) ABSTRACT

The present disclosure relates to method for a robotic work tool system (220), where the method comprises controlling (S200) the movement of an outdoor robotic work tool (100) using a user terminal (205), acquiring (S300) position data for the robotic work tool (100), and providing (S400) boundary installation points (202*a*, 202*b*, 202*c*, 202*d*) during a setup phase as the robotic work tool (100) is controlled to move within an operation area (203). A boundary (201) that defines the operation area (203) is defined by means of the boundary installation points (202*a*, 202*b*, 202*c*, 202*d*). The method further comprises presenting (S600) data to a user about the position of at least one boundary installation point (202*b*) that is closest to a current position (P) of the robotic work tool (100), where the data is presented via a user terminal display (206) of the user terminal (205), and moving (S700), or inserting, at least one boundary installation point (202*b*') in response to a user's instruction via the user terminal such that a boundary (201) that defines the operation area (203) is altered (201).

17 Claims, 4 Drawing Sheets

(58) Field of Classification Search

CPC .... G05D 1/242; G05D 1/248; G05D 2105/15; G05D 2107/23; G05D 2109/10; G05D 1/2297; G05D 1/243; G05D 1/6484; G05D 1/43; G05D 1/221; G05D 1/2245; G05D 1/644; G05D 1/648; A01D 34/008

USPC .......... 701/23, 25, 50, 26, 2, 28, 301, 24, 1, 701/300, 469, 532, 468, 410, 533, 36, 701/409, 411, 450, 467, 446, 541, 416, 701/436, 527, 121, 425, 420, 34.4, 116, 701/32.3, 461, 454, 48

See application file for complete search history.

(56) References Cited

U.S. PATENT DOCUMENTS

| | | | | |
|---|---|---|---|---|
| 2002/0156556 | A1 | 10/2002 | Ruffner | |
| 2016/0100522 | A1* | 4/2016 | Yamauchi | A01B 69/008 701/25 |
| 2019/0163174 | A1* | 5/2019 | Ko | A01D 34/008 |
| 2019/0346848 | A1* | 11/2019 | Zhou | A01D 34/008 |
| 2020/0037498 | A1* | 2/2020 | Ko | A01D 34/008 |
| 2020/0103906 | A1* | 4/2020 | O'Donnell | E01C 19/004 |
| 2020/0225673 | A1 | 7/2020 | Ebrahimi Afrouzi et al. | |
| 2020/0267896 | A1 | 8/2020 | Ingvalson et al. | |
| 2020/0275604 | A1* | 9/2020 | Chen | A01D 34/008 |
| 2020/0275605 | A1 | 9/2020 | Chen et al. | |
| 2020/0356088 | A1* | 11/2020 | Schlacks, IV | E02F 9/0841 |
| 2021/0247775 | A1* | 8/2021 | Cen | B25J 13/089 |
| 2024/0103545 | A1* | 3/2024 | Chen | G05D 1/6484 |

FOREIGN PATENT DOCUMENTS

| | | | |
|---|---|---|---|
| KR | 20190064252 | A | 6/2019 |
| KR | 20200015877 | A | 2/2020 |
| WO | 2020027496 | A1 | 2/2020 |
| WO | 2020159101 | A1 | 8/2020 |

OTHER PUBLICATIONS

Swedish Office Action and Search Report for Swedish Application No. 2051431-1, Mailed on Sep. 8, 2021.

* cited by examiner

ROBOTIC WORK TOOL WITH A RE-DEFINABLE OPERATION AREA

TECHNICAL FIELD

The present disclosure relates to robotic work tool, such as a robotic lawn mower, that is adapted to operate within a certain operation area, circumvented by a border. Sometimes it is desired to re-define the operation area.

BACKGROUND

Robotic work tools such as for example robotic lawn mowers are becoming increasingly more popular. In a typical deployment a work area, such as a garden, the work area is enclosed by a boundary wire with the purpose of keeping the robotic lawn mower inside the work area. An electric control signal may be transmitted through the boundary wire thereby generating an (electro-) magnetic field emanating from the boundary wire. The robotic working tool is typically arranged with one or more sensors adapted to sense the control signal.

Alternatively, or as a supplement, the robotic lawn mower can be equipped with a navigation system that is adapted for satellite navigation by means of GPS (Global Positioning System) or some other Global Navigation Satellite System (GNSS) system, for example using Real Time Kinematic (RTK). In addition to this, the navigation system is adapted for navigation by means of a local base station that can be housed in a charging station and provide a navigation signal that further increases the navigation accuracy.

The robotic lawn mower is adapted to cut grass on a user's lawn automatically and can be charged automatically without intervention of the user, and does not need to be manually managed after being set once.

In the case of having navigation system, a user can control the robotic lawn mower by means of a user terminal during setup, for example an application program in a smartphone. Boundary installation points are continuously provided during the setup as the robotic lawn mower moves within the area it is intended to operate in response to the user's control.

However, after a while it can be discovered that the robotic lawn mower does not run completely where intitally intended, and that some parts are not cut as desired, or other parts are entered that should not be entered. It is also conceivable that initial operation area has been changed, for example by insertion of objects such as a wood deck or by expansion of the lawn. The operation area then needs to be re-defined.

It is therefore desired to provide means and a method for uncomplicated and quickly managed re-defining of a robotic work tool operation area.

SUMMARY

The object of the present disclosure is to provide means and a method for uncomplicated and quickly managed re-defining of a robotic work tool operation area.

This object is achieved by means of method for a robotic work tool system, where the method comprises controlling the movement of an outdoor robotic work tool using a user terminal, acquiring position data for the robotic work tool, and providing boundary installation points during a setup phase as the robotic work tool is controlled to move within an operation area. A boundary that defines the operation area is defined by means of the boundary installation points. The method further comprises presenting data to a user about the position of at least one boundary installation point that is closest to a current position of the robotic work tool, where the data is presented via a user terminal display of the user terminal, and moving, or inserting, at least one boundary installation point in response to a user's instruction via the user terminal such that a boundary that defines the operation area is altered.

This way, a user can easily adjust and re-define the boundary that defines the operation area for the robotic work tool. The user can also easily find a desired position, or sub-area, in the operation area where adjustment is desired.

According to some aspects, the method comprises controlling the robotic work tool to move to a certain position, before presenting boundary installation point data to a user.

This way, the ease in finding a desired position, or sub-area, in the operation area is further enhanced.

According to some aspects, controlling the robotic work tool to move to a certain position comprises inserting an additional boundary installation point that is positioned at the certain position.

This way, the ease in both finding a desired position, or sub-area, in the operation area, and performing the adjustment and re-definition of the boundary, are further enhanced.

According to some aspects, the method comprises providing instructions to the user terminal, which instructions enable a user to control the robotic work tool via the user terminal, be presented with said data, and to move at least one boundary installation point.

This way, the user terminal is modified to comprise a desired functionality.

According to some aspects, the instructions enable the user terminal to establish a wireless connection directly with the robotic work tool.

This way, the user terminal can communicate directly with the robotic work tool, without any extra equipment needed.

According to some aspects, the instructions enable the user terminal to establish a wireless connection with the robotic work tool via a remote server.

This way, a part of the desired functionality is provided at a remote server, alleviating the requirements for the user terminal.

According to some aspects, the certain position is either constituted by the closest boundary installation point or is positioned along a line connecting the closest 30 boundary installation point and another boundary installation point.

According to some aspects, the moving, or inserting, of at least one boundary installation point comprises moving or inserting a line connecting two boundary installation points.

This way, the user is presented with versatility and different choices when controlling the robotic work tool and re-defining the border.

According to some aspects, the moving, or inserting, of at least one boundary installation point is restricted to certain predetermined distance.

This way, the risk for undesired changes taking place is decreased.

According to some aspects, the method comprises informing the user of a distance between the boundary and an object that triggers a collision sensor comprised in the robotic work tool.

According to some aspects, the method comprises informing the user of a distance between the boundary and a current position of a front part the robotic work tool.

This way, the user can be provided with different types of information regarding the border and the operation area.

The present disclosure also relates to robotic lawn mowers and robotic work tool systems that are associated with above advantages.

In particular, it should be noted that the control unit, the user terminal and the remote server, when a remote server is used, can handle different part of the desired functionality. For example, at least partial data regarding the border and the operation area can be stored at either one of the user terminal and the remote server, or at both.

BRIEF DESCRIPTION OF THE DRAWINGS

The present disclosure will now be described more in detail with reference to the 30 appended drawings, where.

DETAILED DESCRIPTION

Figure 1A:
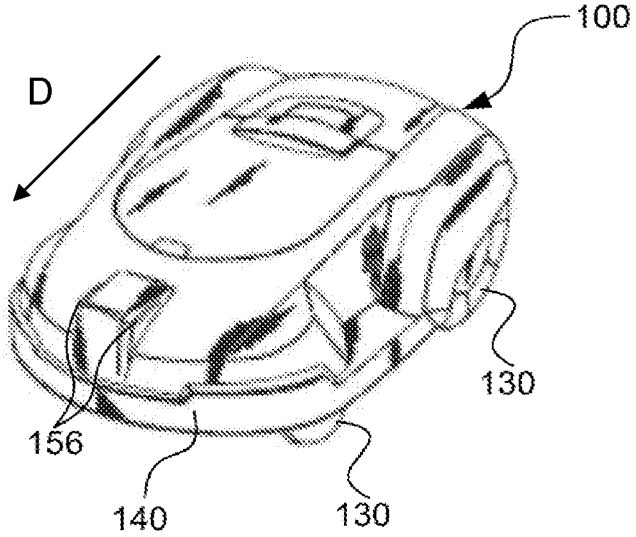
FIG. 1A shows a perspective side view of a robotic lawn mower.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1B:
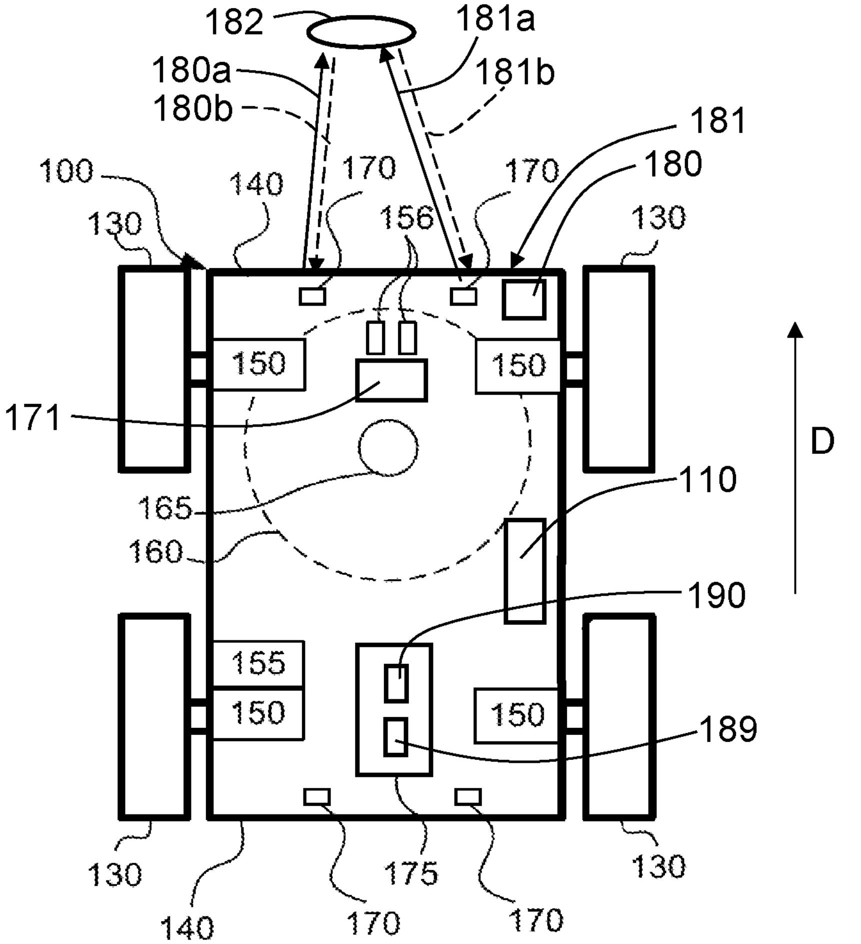
FIG. 1B shows a schematic overview of the robotic lawn mower.

FIG. 1A shows a perspective view of a robotic lawn mower 100 and FIG. 1B shows a schematic overview of the robotic lawn mower 100. The robotic lawn mower 100 is adapted for a forward travelling direction D, has a body 140 and a plurality of wheels 130; in this example the robotic lawnmower 100 has four wheels 130, two front wheels and two rear wheels. The robotic lawn mower 100 comprises a control unit 110 and at least one electric motor 150, where at least some of the wheels 130 are drivably connected to at least one electric motor 150. It should be noted that even if the description herein is focused on electric motors, combustion engines may alternatively be used in combination with an electric motor arrangement. The robotic lawn mower 100 may be a multi-chassis type or a mono-chassis type. A multi-chassis type comprises more than one body parts that are movable with respect to one another. A mono-chassis type comprises only one main body part.

In this example embodiment, the robotic lawnmower 100 is of a mono-chassis type, having a main body part 140. The main body part 140 substantially houses all components of the robotic lawnmower 100.

The robotic lawnmower 100 also comprises a grass cutting device 160, such as a rotating blade 160 driven by a cutter motor 165. The robotic lawnmower 100 also has at least one rechargeable electric power source such as a battery 155 for providing power to the electric motor arrangement 150 and/or the cutter motor 165.

Figure 2:
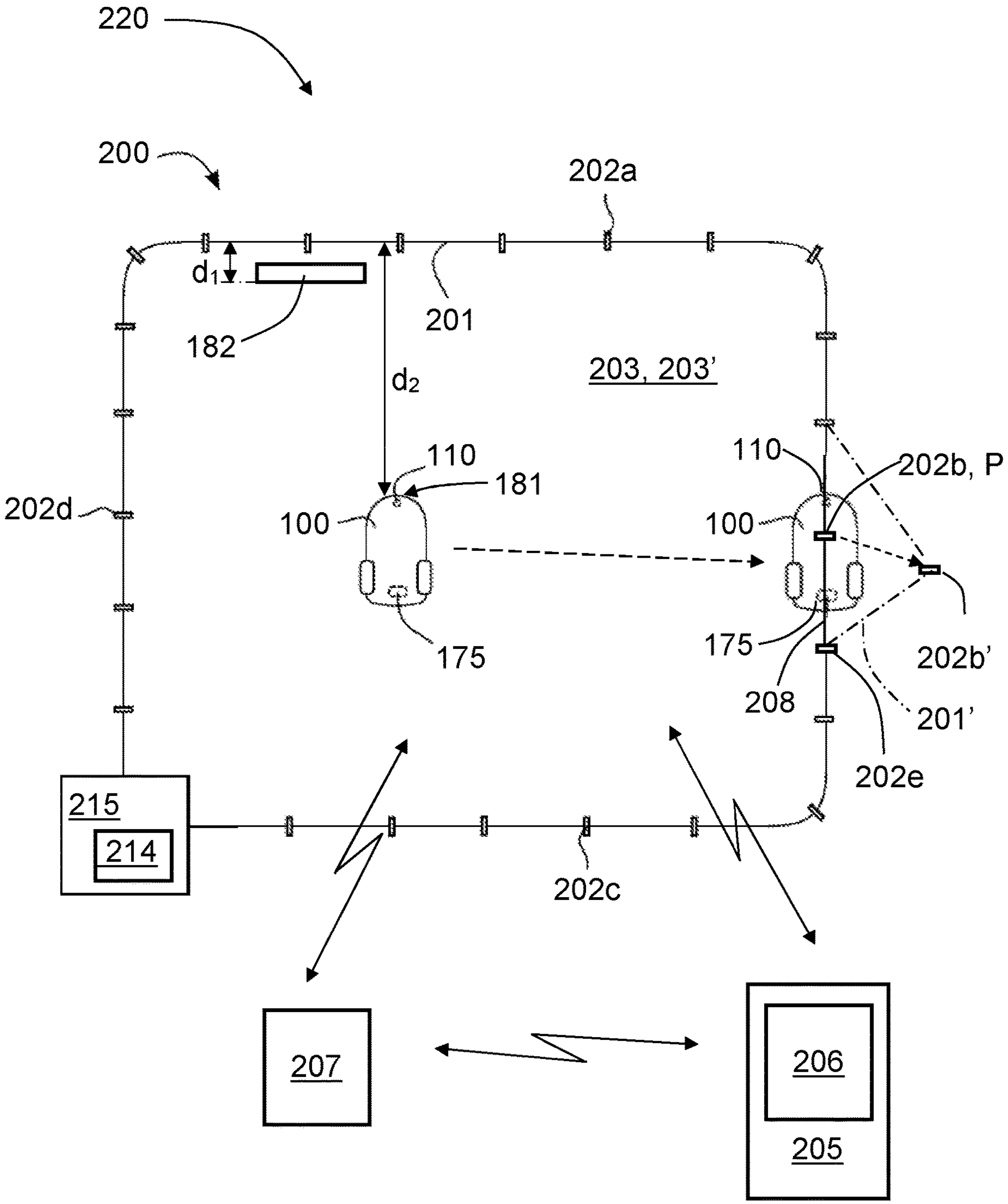
FIG. 2 schematically illustrates a an operation area for an outdoor robotic lawn mower system.

With reference also to FIG. 2, the battery 155 is arranged to be charged by means of received charging current from a charging station 215, received through charging skids 156 or other suitable charging connectors. Inductive charging without galvanic contact, only by means of electric contact, is also conceivable. The battery is generally constituted by a rechargeable electric power source 155 that comprises one or more batteries that can be separately arranged or be arranged in an integrated manner to form a combined battery.

According to some aspects, the robotic lawnmower 100 may further comprise at least one navigation sensor arrangement 175. In one embodiment, the navigation sensor arrangement 175 comprises one or more sensors for deduced navigation. Examples of sensors for deduced reckoning are odometers, accelerometers, gyroscopes, and compasses to mention a few examples. In one embodiment, the navigation sensor arrangement 175 comprises a beacon navigation sensor 189 and/or a satellite navigation sensor 190. The beacon navigation sensor may be a Radio Frequency receiver, such as an Ultra Wide Band (UWB) receiver or sensor, configured to receive signals from a Radio Frequency beacon, such as a UWB beacon or other type of local base station 214 that can be housed in the charging station 215 or at any other suitable location and provide a navigation signal that further increases the navigation accuracy.

The satellite navigation sensor may be a GPS (Global Positioning System) device or other Global Navigation Satellite System (GNSS) device, according to some aspects for example using Real Time Kinematic (RTK).

The robotic lawn mower 100 thus comprises a navigation system 175 that according to some aspects is adapted for satellite navigation and/or navigation by means of one or more local beacons in the form of one or more local base stations 214. The robotic lawn mower 100 further comprises a control unit 110 adapted to control the operation of the robotic lawn mower 100. The control unit 110 is further adapted to receive position data from the navigation system 175 and instructions from a user terminal 205, said instructions comprising directions for movement of the robotic lawn mower 100.

According to some aspects, the robotic lawn mower 100 further comprises at least one environment detection device 170, 171. In this example, radar transceivers 170 are provided and adapted to transmit signals 180*a*, 180*b* and to receive reflected signals 180*b*, 181*b* that have been reflected by an object 182. To enable this, according to some aspects, each detector transceiver 170 comprises a corresponding transmitter arrangement and receiver arrangement together with other necessary circuitry in a well-known manner. In this example, the robotic lawn mower 100 further comprises a camera device 171 that is adapted to provide images of the environment in front of the robotic lawn mower 100, for example images of the object 182.

For this purpose, the control unit 110 is adapted to control the camera device 171 and the radar transceivers 170 and to control the speed and direction of the robotic lawn mower 100 in dependence of information acquired by means of the of the radar transceivers 170 when the robotic lawn mower 100 is moving.

According to some aspects, the robotic lawn mower 100 further comprises at least one collision detection device 180.

A user can control the robotic lawn mower by means of a user terminal 205 during a setup phase, for example an application program in a smartphone. The robotic lawn mower 100 is adapted to provide first geographic data, according to some aspects this is performed by the control unit 110 that uses input from the navigation sensor arrangement 175. The first geographic data enable boundary installation points 202*a*, 202*b*, 202*c*, 202*d*, 202*e* to be provided during the setup phase as the robotic lawn mower 100 is controlled to move within an operation area 203 in response to the instructions from the user terminal 205, according to some aspects when the user is providing instructions via the user terminal 205. The movement of a robotic lawn mower 100 is thus controlled using a user terminal 205, for example the robotic lawn mower 100 is controlled to move in desired directions.

A boundary 201 that defines the operation area 203 is defined by means of the boundary installation points 202*a*, 202*b*, 202*c*, 202*d*, and the robotic lawn mower 100 is adapted to operate within that boundary 201.

In this context, moving within an operation area 203 or within a boundary 201 means that the body 140 and wheels 130 of the robotic lawn mower 100 at least partly are positioned within an operation area 203 or within a boundary 201. This means that the robotic lawn mower 100 can be moving on a boundary. It is of course also conceivable that no part of the robotic lawn mower 100 crosses the boundary 201.

After a while, it may be desired to change the boundary 201 and thus redefine the operation area 203. For example, the robotic lawn mower 100 does not run completely where initially intended, some parts may not be cut as desired, or other parts are entered that should not be entered. It is also conceivable that the initial operation area has been changed, for example by insertion of objects such as a wood deck or by expansion of the lawn.

The user then operates the robotic lawn mower 100 to move to the place in question using the user terminal 205. When in place, and possibly upon request by the user, the robotic lawn mower 100 is adapted to provide second geographic data to the user terminal 205, where the second geographic data enable the user terminal 205 to present data about the position of at least one boundary installation point 202*b* that is closest to the current position P of the robotic lawn mower 100. According to some aspects, this means that the closest boundary installation point 202*b* is highlighted in a user terminal display 206.

According to some aspects, the control unit 110 is adapted to receive instructions from the user terminal to move to a certain position P, and when the robotic lawn mower 100 has reached that position P, the control unit 110 is adapted to provide the second geographic data. When the robotic lawn mower 100 has reached the certain position P, it becomes the current position P.

According to some aspects, by means of inputting new position data for the closest boundary installation point 202*b*, it can be moved to a desired position, for example by the user sliding a finger over the user terminal display 206 that can be touch-sensitive such that a tactile response of the user terminal display 206 updates the position of the closest boundary installation point 202*b*. When the user confirms the updated position of the closest boundary installation point 202*b*, the control unit 110 is adapted to receive an updated operation area 203'. This means that the control unit 110 is adapted to receive an updated operation area 203' when a user has moved or inserted at least one boundary installation point 202*b*' via the user terminal such that the boundary 201 that defines the operation area 203 is altered 201'.

According to some aspects, when the robotic lawn mower 100 has reached that position P, the control unit 110 is adapted to provide the second geographic data automatically. The position P can be constituted by a boundary installation point such as the closest boundary installation point 202*b* as shown in FIG. 2, or any other point defined by the user, or even being positioned along a line 208 connecting the closest boundary installation point 202*b* and another boundary installation point 202*e*.

The user can thus indicate the point P or the line 208 at the user terminal 205 and instruct the robotic lawn mower 100 to move there. The user can also control the robotic lawn mower 100 to move to the position P by controlling its movements by means of the user terminal 205.

Instead of moving a boundary installation point, the user can alternatively, or additionally, insert one or more new boundary installation points. Moving or inserting at least one boundary installation point 202*b*' comprises the alternative of moving or inserting a line 208 connecting two boundary installation points 202*b*', 202*e*. 8S. According to some aspects, the movement or insertion of at least one boundary installation point 202*b*' is restricted to certain predetermined distance.

The present disclosure relates to a robotic work tool system 220 that comprises the user terminal 205 and a robotic work tool 100 such as a robotic lawn mower 100. It should be noted that even though the description given herein has been focused on robotic lawn mowers, the teachings herein may also be applied to any type of outdoor robotic work tool, such as for example robotic ball collectors, robotic mine sweepers and robotic farming equipment.

In the following, the more general term robotic work tool 100 will be used, and in this context, an outdoor robotic work tool 100 is in particular intended.

According to some aspects, the user terminal 205 is a special remote control provided specifically for the robotic work tool system 220, or a mobile phone such as a smart phone with a touch-sensitive display 206. In the case of the user terminal 205 being in the form of a smart phone, the smart phone is modified to function as a user terminal in the robotic work tool system 220, and the interaction with the robotic work tool 100 is performed via an application program, an App. The App is either downloaded into the user terminal 205 or run at a remote server 207, and the App can have been downloaded into the user terminal 205 from the remote server 207.

The user terminal 205 is adapted for wireless communication with the robotic work tool, either directly or via the remote server 207.

This means that, according to some aspects, the user terminal 205 is adapted to control the robotic work tool 100 to move within the operation area 203 in response to user input and to receive information regarding the boundary installation points 202*a*, 202*b*, 202*c*, 202*d*. The user terminal 205 is furthermore adapted to control the robotic work tool 100 to move to a certain position P in response to user input, and to present, to a user, data about the position of at least one boundary installation point 202*b* that is closest to the current position P of the robotic work tool 100.

Data regarding boundary installation points 202*a*, 202*b*, 202*c*, 202*d*, the boundary 201 and the operation area 203 can be stored and processed at least at one of the user terminal 205, the control unit 110 and the remote server 207, possibly at two or more of these. For example the boundary installation points 202*a*, 202*b*, 202*c*, 202*d*, 202*e* can be determined based on the first geographic data from at one or more of the user terminal 205, the control unit 110 and the remote server 207.

According to some aspects, the user terminal 205 is adapted to receive the first geographic data from the robotic work tool 100 and to determine the boundary installation points 202*a*, 202*b*, 202*c*, 202*d* based on the received first geographic data.

According to some aspects, the robotic work tool system 220 comprises the remote server 207 that is adapted for wireless communication with the robotic work tool 100 and the user terminal 205, where the remote server 207 is adapted to receive the first geographic data from the robotic work tool 100 and to determine the boundary installation points 202*a*, 202*b*, 202*c*, 202*d* based on the received first geographic data, and to provide data about the boundary installation points 202*a*, 202*b*, 202*c*, 202*d* to the user terminal 205.

According to some aspects, the user terminal 205 is adapted to receive the second geographic data from the robotic work tool 100 and to determine the position of at least one boundary installation point 202*b* that is closest to the current position P of the robotic work tool 100.

According to some aspects, the remote server 207 is adapted to receive the second geographic data from the robotic work tool 100 and to determine the position of at least one boundary installation point 202*b* that is closest to the current position P of the robotic work tool 100, and to provide data regarding said boundary installation point 202*b* to the robotic work tool 100.

According to some aspects, the user terminal 205 is adapted to initiate movement or insertion of at least one boundary installation point 202*b*' in response to user input, such that the boundary 201 that defines the operation area 203 is altered 201', such that an altered operation area 203' can be provided to the robotic work tool 100.

According to some aspects, the user terminal 205 is adapted to initiate movement or insertion of at least one boundary installation point 202*b*' in response to user input, where the user input comprises moving or inserting a line 208 connecting two boundary installation points 202*b*', 202*e*.

According to some aspects, the movement or insertion of at least one boundary installation point 202*b*' is restricted to certain predetermined distance.

According to some aspects, the user terminal 205 is adapted to inform the user of a distance $d_1$ between the boundary 201 and an object 182 that triggers a collision sensor 180 comprised in the robotic work tool 100.

According to some aspects, the user terminal 205 is adapted to inform the user of a distance $d_2$ between the boundary 201 and a current position of a front part 181 the robotic work tool 100.

Figure 3:
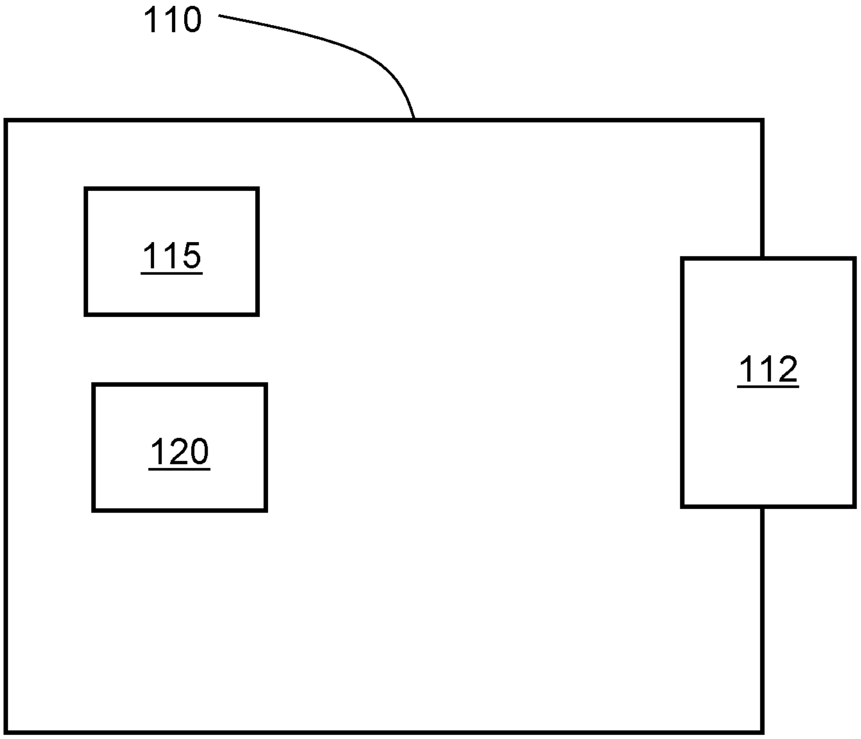
FIG. 3 shows a schematic view of a control unit.

In FIG. 3 it is schematically illustrated, in terms of a number of functional units, the components of the control unit 110 according to embodiments of the discussions herein. Processing circuitry 115 is provided using any combination of one or more of a suitable central processing unit CPU, multiprocessor, microcontroller, digital signal processor DSP, etc., capable of executing software instructions stored in a computer program product, e.g. in the form of a storage medium 120. The processing circuitry 115 may further be provided as at least one application specific integrated circuit ASIC, or field programmable gate array FPGA. The processing circuitry thus comprises a plurality of digital logic components.

Particularly, the processing circuitry 115 is configured to cause the control unit 110 to perform a set of operations, or steps to control the operation of the robotic work tool 100 including, but not being limited to, controlling the radar transceivers 170, processing measurements results received via the radar transceivers 170, and the propulsion of the robotic work tool 100. For example, the storage medium 120 may store the set of operations, and the processing circuitry 115 may be configured to retrieve the set of operations from the storage medium 120 to cause the control unit 110 to perform the set of operations. The set of operations may be provided as a set of executable instructions. Thus, the processing circuitry 115 is thereby arranged to execute at least parts of the methods as herein disclosed.

The storage medium 120 may also comprise persistent storage, which, for example, can be any single one or combination of magnetic memory, optical memory, solid state memory or even remotely mounted memory.

According to some aspects, the control unit 110 further comprises an interface 112 for communications with at least one external device such as the user terminal 205. As such the interface 112 may comprise one or more transmitters and receivers, comprising analogue and digital components and a suitable number of ports for wireline communication. The interface 112 can be adapted for communication with other devices, such as the remote server 207, the charging station 215, and/or other robotic working tools. Examples of such wireless communication devices are Bluetooth®, WiFi® (IEEE802.11b), Global System Mobile (GSM) and LTE (Long Term Evolution), to name a few.

Figure 4:
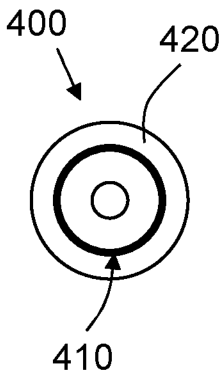
FIG. 4 shows a computer program product.

FIG. 4 shows a computer program product 400 comprising computer executable instructions 410 stored on media 420 to execute any of the methods disclosed herein.

Similar control units are present in the remote server 207 and the user terminal 205, where these control units are adapted for two or more together performing all the method steps discussed.

Figure 5:
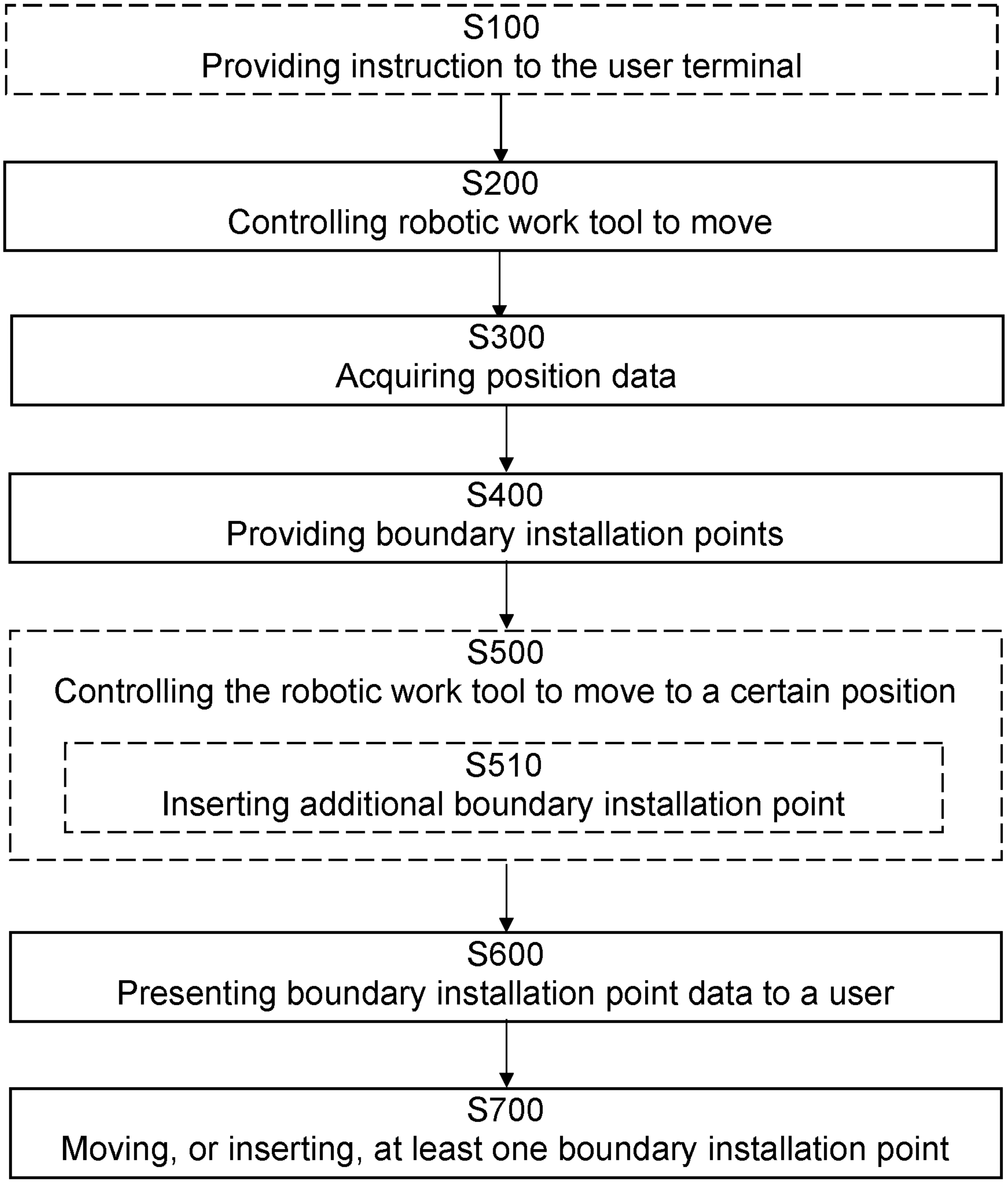
FIG. 5 shows a flowchart for methods according to the present disclosure.

With reference to FIG. 5, the present disclosure also relates to a method for a robotic work tool system 220, where the method comprises controlling S200 the movement of a robotic work tool 100 using a user terminal 205 and acquiring S300 position data for the robotic work tool 100. The method further comprises providing S400 boundary installation points 202*a*, 202*b*, 202*c*, 202*d* during a setup phase as the robotic work tool 100 is controlled to move within an operation area 203, where a boundary 201 that defines the operation area 203 is defined by means of the boundary installation points 202*a*, 202*b*, 202*c*, 202*d*, and presenting S600 data to a user about the position of at least one boundary installation point 202*b* that is closest to a current position P of the robotic work tool 100, where the data is presented via a user terminal display 206 of the user terminal 205. The method also comprises moving S700, or inserting, at least one boundary installation point 202*b*' in response to a user's instruction via the user terminal such that a boundary 201 that defines the operation area 203 is altered 201'.

According to some aspects, the method further comprises controlling S500 the robotic work tool 100 to move to a certain position P, before presenting S500 boundary installation point data to a user.

According to some aspects, controlling S500 the robotic work tool 100 to move to a certain position P comprises inserting S510 an additional boundary installation point 202*b* that is positioned at the certain position P.

According to some aspects, the method further comprises providing S100 instructions to the user terminal, which instructions enable a user to control 200 the robotic work tool 100 via the user terminal 205, be presented S600 with said data, and to move S700 at least one boundary installation point 202*b*'. For example, this means that that program instructions that can be provided in the form of an App, are provided for the user terminal 205.

According to some aspects, the instructions enable the user terminal 205 to establish a wireless connection directly with the robotic work tool 100.

According to some aspects, the instructions enable the user terminal to establish a wireless connection with the robotic work tool 100 via a remote server 207.

According to some aspects, the certain position P either is constituted by the closest boundary installation point 202*b* or is positioned along a line 208 connecting the closest boundary installation point 202*b* and another boundary installation point.

According to some aspects, the moving S700, or inserting, of at least one boundary installation point 202*b*' comprises moving or inserting a line 208 connecting two boundary installation points 202*b*', 202*e*.

According to some aspects, the moving S700, or inserting, of at least one boundary installation point 202*b*' is restricted to certain predetermined distance.

According to some aspects, with reference to FIG. 2, the method comprises informing the user of a first distance $d_1$ between the boundary 201 and an object 182 that triggers the collision sensor 180 comprised in the robotic work tool 100. Such an object can be a fixed objects such as a wall or movable objects such as garden furniture or flower pots.

According to some aspects, with reference to FIG. 2, the method comprises informing the user of a second distance $d_2$ between the boundary 201 and a current position of a front part 181 the robotic work tool 100.

According to some aspects, the remote server can be any type of computer-related device that is more or less remote from the robotic work tool system 220, for example a domestic server, or in the form of a cloud-based service.

According to some aspects, the control unit 110, the user terminal 205 and the remote server 207, when a remote server is used 207, can handle different part of the desired functionality. For example, at least partial data regarding the border 201 and the operation area 203 can be stored at either one of the control unit 110, the user terminal 205 and/or the remote server, or at two or more of them.

The invention claimed is:

1. A method for a robotic work tool system, wherein the method comprises:

controlling movement of an outdoor robotic work tool using a user terminal;

acquiring position data for the robotic work tool;

providing boundary installation points during a setup phase as the robotic work tool is controlled to move within an operation area, wherein a boundary that defines the operation area is defined by the boundary installation points;

controlling the robotic work tool to move to a certain position proximate to a selected one of the boundary installation points, before presenting boundary installation point data to a user;

presenting on a user terminal display a boundary installation point that is closest to a current position of the robotic work tool, as the selected one of the boundary installation points; and making an adjustment to a location of the selected one of the boundary installation points in response to a user's instruction via the user terminal to alter the boundary such that the boundary that defines the operation area is re-defined.

2. The method according to claim 1, wherein controlling the robotic work tool to move to a certain position comprises inserting an additional boundary installation point that is positioned at the certain position.

3. The method according to claim 1, further comprising providing instructions to the user terminal, the instructions enabling a user to control the robotic work tool via the user terminal, be presented with said boundary installation point data, and to move at least one boundary installation point.

4. The method according to claim 3, wherein the instructions enable the user terminal to establish a wireless connection directly with the robotic work tool.

5. The method according to claim 1, wherein the instructions enable the user terminal to establish a wireless connection with the robotic work tool via a remote server.

6. The method according to claim 1, wherein the current position either is a closest boundary installation point or is positioned along a line connecting the closest boundary installation point and another boundary installation point.

7. The method according to claim 1, wherein the adjustment to a location of the selected one of the boundary installation points comprises moving or inserting a line connecting two boundary installation points, or is restricted to certain predetermined distance.

8. The method according to claim 1, wherein the method comprises informing the user of a distance between the boundary and either an object that triggers a collision sensor comprised in the robotic work tool, or a current position of a front part the robotic work tool.

9. An outdoor robotic work tool comprising a navigation system and a control unit adapted to control the operation of the robotic work tool, wherein the control unit further is adapted to receive position data from the navigation system and instructions from a user terminal, said instructions comprising directions for movement of the robotic work tool, wherein the control unit is adapted to provide first geographic data that enable boundary installation points to be provided during a setup phase as the robotic work tool is controlled to move within an operation area in response to the instructions from the user terminal, wherein a boundary that defines the operation area in turn is defined by means of the boundary installation points, wherein the control unit is adapted to receive instructions from the user terminal to move to a certain position proximate to a selected one of the boundary installation points, and when the robotic work tool has reached the certain position, the control unit is adapted to provide the second geographic data to the user terminal, wherein the second geographic data enables the user terminal to display a boundary installation point that is closest to a current position of the robotic work tool, as the selected one of the boundary installation points, and wherein the control unit is adapted to receive an updated operation area in response to the user making an adjustment to a location of the selected one of the boundary installation points via the user terminal to alter the boundary such that the boundary that defines the operation area is re-defined.

10. The robotic work tool according to claim 9, wherein the certain position either is the closest boundary installation point or is positioned along a line connecting the closest boundary installation point and another boundary installation point.

11. A robotic work tool system comprising an outdoor robotic work tool according to claim 9, wherein the robotic work tool system further comprises the user terminal arranged for wireless communication, wherein the user terminal is adapted to control the robotic work tool to move within the operation area in response to user input;

receive information regarding the boundary installation points;

control the robotic work tool to move to a certain position in response to user input;

present, to a user, data about the position of at least one boundary installation point that is closest to the current position of the robotic work tool.

12. The robotic work tool system according to claim 11, wherein the user terminal is adapted to receive the first geographic data from the robotic work tool and to determine the boundary installation points based on the received first geographic data.

13. The robotic work tool system according to claim 11, wherein the robotic work tool system comprises a remote server that is adapted for wireless communication with the robotic work tool and the user terminal, wherein the remote server is adapted to receive the first geographic data from the robotic work tool and to determine the boundary installation points based on the received first geographic data, and to provide data about the boundary installation points to the user terminal.

14. The robotic work tool system according to claim 11, wherein the user terminal is adapted to receive the second geographic data from the robotic work tool and to determine the position of at least one boundary installation point that is closest to the current position of the robotic work tool.

15. The robotic work tool system according to claim 11, wherein the remote server is adapted to receive the second geographic data from the robotic work tool and to determine the position of at least one boundary installation point that is closest to the current position of the robotic work tool, and to provide data regarding said boundary installation point to the robotic work tool.

16. The robotic work tool system according to claim 11, wherein the user terminal is adapted to initiate movement or insertion of at least one boundary installation point in response to user input, either such that the boundary that defines the operation area is altered, such that an altered operation area can be provided to the robotic work tool, or such that the user input comprises moving or inserting a line connecting two boundary installation points, and wherein the movement or insertion of at least one boundary installation point is restricted to a certain predetermined distance.

17. The robotic work tool system according to claim 11, wherein the user terminal is adapted to inform the user of a distance between the boundary and either an object that triggers a collision sensor comprised in the robotic work tool, or a current position of a front part the robotic work tool.

* * * * *